US007845580B2

(12) United States Patent
Liao

(10) Patent No.: US 7,845,580 B2
(45) Date of Patent: Dec. 7, 2010

(54) FOUNTAIN BASE WITH BASIN, STATUE SUPPORT AND ACCESS LID

(76) Inventor: Xianming Liao, 1899 Peachtree Pkwy., Cumming, GA (US) 30041

( * ) Notice: Subject to any disclaimer, the term of this patent is extended or adjusted under 35 U.S.C. 154(b) by 130 days.

(21) Appl. No.: 12/028,997

(22) Filed: Feb. 11, 2008

(65) Prior Publication Data

US 2008/0191053 A1 Aug. 14, 2008

Related U.S. Application Data

(60) Provisional application No. 60/900,437, filed on Feb. 9, 2007, provisional application No. 60/975,606, filed on Sep. 27, 2007.

(51) Int. Cl.
*B05B 17/08* (2006.01)
*E03B 9/20* (2006.01)
*F21S 8/00* (2006.01)
*F16M 13/00* (2006.01)

(52) U.S. Cl. ............................ 239/17; 239/16; 239/18; 239/19; 239/20; 239/21; 239/22; 239/23; D23/201; 248/519

(58) Field of Classification Search .................. 239/17, 239/16, 20, 18, 19, 21, 22, 23; D23/201; 248/519, 678, 188.1, 346.01
See application file for complete search history.

(56) References Cited

U.S. PATENT DOCUMENTS 3,419,216 A * 12/1968 Angelastro et al. ............ 239/20
3,838,816 A * 10/1974 Huff et al. ..................... 239/18
3,841,023 A * 10/1974 Carlyon, Jr. .................... 47/82
6,565,940 B1 * 5/2003 Lin ........................... 428/64.1
6,871,793 B2 * 3/2005 Rumens et al. ............... 239/16
6,921,023 B1 * 7/2005 Bright et al. .................. 239/17
7,341,203 B1 * 3/2008 Yeomans et al. .............. 239/20
7,445,162 B1 * 11/2008 Forsberg et al. ............... 239/17
2003/0201336 A1 * 10/2003 Rumens et al. ............... 239/17
2004/0020999 A1 * 2/2004 Beidokhti .................... 239/17
2004/0069922 A1 * 4/2004 Wu ............................ 248/519
2007/0138314 A1 * 6/2007 Weemhoff ................... 239/16
2008/0142612 A1 * 6/2008 Potter .......................... 239/17

* cited by examiner

*Primary Examiner*—Len Tran
*Assistant Examiner*—Steven M Cernoch
(74) *Attorney, Agent, or Firm*—Michael J. Mehrman; Mehrman Law Office P.C.

(57) ABSTRACT

A fountain base for supporting one or more statues on top of a disappearing water fountain. The fountain base includes a basin, a statue support located in the basin, and an access lid that permits maintenance access to the interior of the basin without having to remove the statue from the statue support. A pump located within the basin delivers water from the basin to the top of the statue where it is released to flow over the exterior of the surface of the statue, through the access lid, and back into the basin. The access lid, which may be supported by a statue stand or a system of pillars, includes one or more panels that can be removed without removing the statue from the statue support. The panels may include access doors to permit easy access to the interior of the basin.

7 Claims, 15 Drawing Sheets

FOUNTAIN BASE WITH BASIN, STATUE SUPPORT AND ACCESS LID

REFERENCE TO RELATED APPLICATIONS

This application claims priority to U.S. Provisional Patent Application Ser. No. 60/900,437 entitled "Fountain Base with Statue Stand and Access Lid" filed Feb. 9, 2007 and Application Ser. No. 60/975,606 entitled "Fountain Base with Support Posts and Cover Sections" filed Sep. 27, 2007, which are incorporated herein by reference.

TECHNICAL FIELD

The invention pertains to decorative water fountains and, more particularly, to a fountain base for a disappearing water fountain having a basin, at least one statue support, and a segmented access lid that permits maintenance access to the interior of the basin without having to remove the statue from the fountain base.

BACKGROUND

Decorative water fountains often include a basin that serves as a water reservoir, at least one statue supported in or above the basin, and a pump that delivers water from the basin to some location on the statue. The water then sprays from or flows down the surface of the statue and returns into the basin. The term "disappearing water fountain" typically refers a fountain in which the water reservoir is hidden, often below pebbles or some other decorative cover material.

Disappearing water fountains have been constructed using a sturdy porous lid that covers the top of the basin. A statue or multiple statues are then placed on top of a portion of the lid, often in the center of the lid, and pebbles or other decorative cover material is spread over the remainder of the lid. The pump is usually located within the basin, where it feeds a water supply tube that runs up through the statue. The water, which is pumped from the basin up through the water supply tube, is released to flow over the exterior of the statue and into the basin where the water is recaptured and recirculated. This conventional disappearing water fountain design is amenable to standardization of the basin, lid and pump in a few desirable sizes, which produces a modular design that is flexible and amenable to supporting a wide range of statues. This basic design concept can therefore be used to create a wide range of disappearing water fountains from a relatively small number of modular components that can support a wide range of appropriately sized statues.

This conventional disappearing water fountain has a shortcoming, however, in that the statue is typically supported directly on top of the lid covering the basin. Although the lid may include a pump opening to allow removal and replacement of the pump located inside the basin, other types of maintenance and cleaning of the basin require removal of the statue and the lid covering the basin. This can be a significant problem when the fountain contains a large statue that has to be detached and physically removed from its position atop the lid. Although other fountain configurations with separate mounting systems for the statute have been designed, they do not have the same modular, easy to install attributes of the modular disappearing water fountain.

Accordingly, there is a need for a disappearing water fountain that is easier to maintain than the conventional disappearing water fountain, and that still retains the same modular, easy to install attributes of the modular disappearing water fountain.

SUMMARY OF THE INVENTION

The present invention meets the heeds described above in a fountain base for supporting a statue on top of a disappearing water fountain base. The fountain base includes a basin sized and configured to be handled by hand as an integral unit, a statue support located within the basin, and a segmented access lid including a number of independently removable panels that permit maintenance access to the interior of the basin without having to remove the statue from the statue support. For example, the fountain base may include a statue stand that supports the statue above the panels so that the panels can be removed without removing the statue stand from the basin and without removing the statue from the statue stand. In addition, one or more of the panels may include an access door that can be opened without removing the statue from the fountain base to permit maintenance access to the interior of the basin. This allows easy access to the interior of the basin, where the pump is located, for maintaining the pump and cleaning the basin.

The basin typically includes one or more integral sockets formed into the bottom side of the basin for receiving and supporting the statute support, which may be a single statue stand or a system of pillars. The basin also includes a support lip around the perimeter near the top of the basin for supporting the segmented access lid. In a round-basin alternative, the statue support includes a statue stand that supports the statue above the panels of the access lid, which allows the panels to be removed without removing the statue stand from the basin and without removing the statue from the statue stand. The statue stand also includes an internal cavity with a routing port for passing a water supply hose from the pump through the statue stand and into connection with a conduit though the statue, which sits on top of the statue stand. An access hole through the central statue stand permits access to the water hose and water connection to the fountain are located. The statue stand is typically received and supported by a centrally located socket formed into the bottom side of the basin.

In a square-basin alternative, the basin includes a number of sockets for receiving a system of support pillars. In this alternative, the statue support includes a number of pillars that extend upward from the basin supporting the segmented access lid. The support pillars receive a central support panel that fits over cuffs and rests on support lips on the pillars. The panels of the access lid are also received on the support pillars over the central support panel to create a sturdy fountain base with an interlocked panel and support pillar system. In both alternatives, the access lid includes multiple panels that are supported by a support lip around the perimeter of the basin and one or more statue supports located within the basin. This allows the pump and associated water hoses to be located within the basin under the access lid, where they can be accessed for maintenance by removing one or more panels of the access lid or through one or more doors in the access lid without having to remove the statue or statues from the fountain base.

In view of the foregoing, it will be appreciated that the present invention provides significant improvements in disappearing water fountains by providing a fountain base in which the interior of the basin can be accessed for maintenance without removing the statue or statues from the fountain base.

DETAILED DESCRIPTION OF ILLUSTRATIVE EMBODIMENTS

Figure 1:
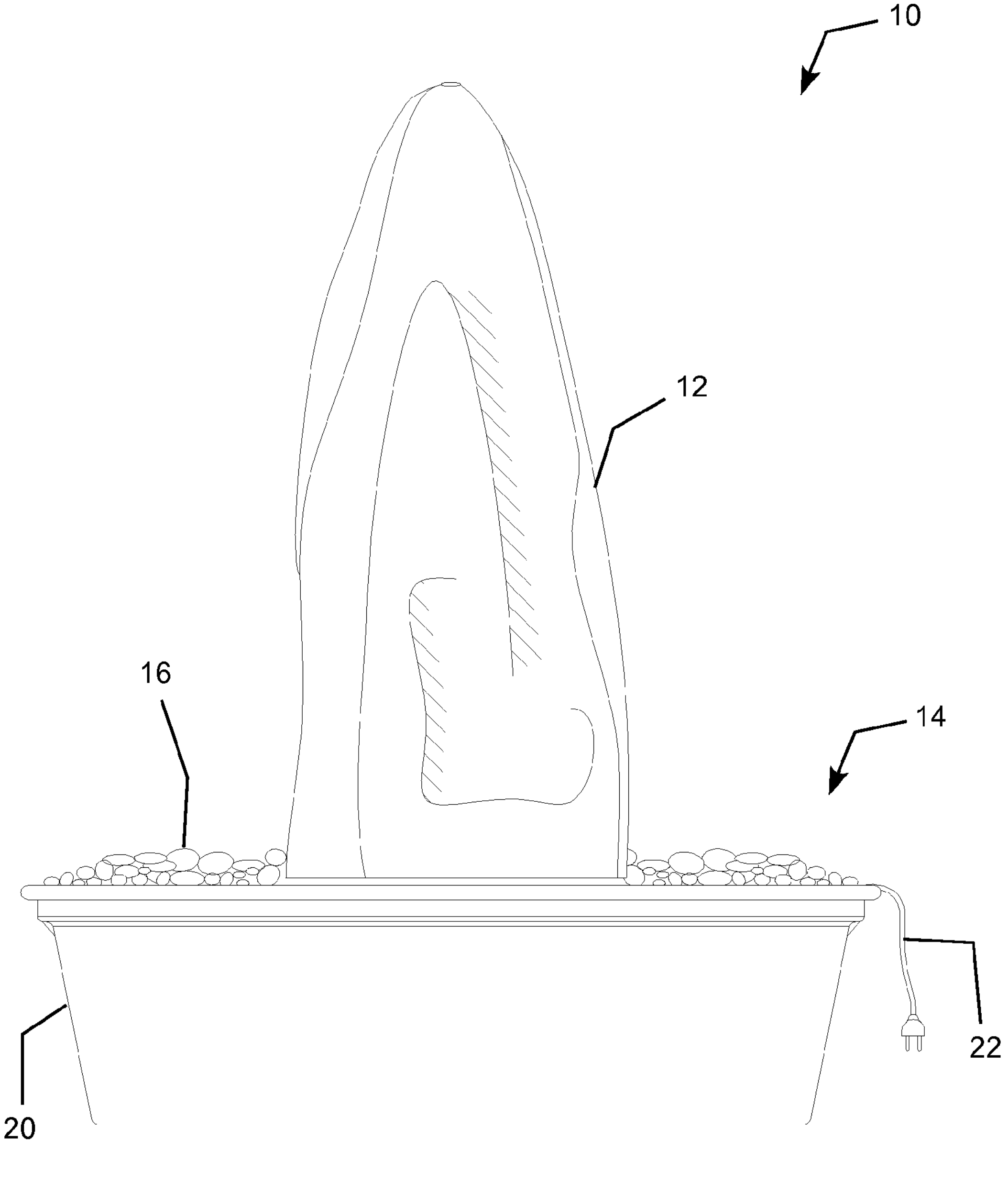
FIG. 1 is a front view of an assembled disappearing water fountain having a round-basin fountain base including a round basin, central statue stand, and an access lid supporting a statue located in the center of the access lid.

The present invention may be embodied in a fountain base for a disappearing water fountain that includes a basin, at least one statue stand, and a segmented access lid that permits maintenance access to the interior of the basin without having to remove the statue from the statue stand. Two illustrative embodiments are shown in the appended figures, including a round-basin fountain base shown in FIGS. 1-16 and a square-basin fountain base shown in FIGS. 17-25. The round-basin fountain base is designed to support a large central statue and can accommodate one or more small spitter fountains, while the square-basin fountain base is well adapted to supporting multiple relatively large statues as well as spitter fountains, as desired. The round-basin fountain base can be 36 inches in diameter, the square-basin fountain base can be 44 inches on each side, and both alternatives are shown substantially to scale in the figures. These basins are light weight and sized and configured to be easily carried and installed by hand as integral units. Typically, one person can easily and quickly install the basin and assemble the fountain base. Other shapes and configurations of the basin can be manufactured based on the principles of the invention, such fountain bases having rectangular, oval, hexagonal or other shaped basins. Custom designs, such as multi-basin fountain bases, fountain bases with tiered statue stands, and other creative designs can also be readily implemented based on the principles of the invention.

The round-basin and square-basin fountain bases are well adapted to provide standard, mass-produced units designed to come from the manufacturer as a complete kit ready for installation with a separately obtained decorative statue or multiple statues and covering material, such as pebbles, of the customer's selection. The kit typically includes a complete fountain base including the basin (water reservoir), one or more statue supports, an access lid, pump, water hoses and other accessories. The installer installs or assembles the parts provided in the kit, installs one more statues on top of the fountain base as desired, fills the basin with water, turns on the power and the fountain starts to run.

For a typical installation, the installer digs a hole in the ground, places the basin in the hole, and then fills in the hole around the basin and brings gravel or other filler material up to the outside surface of the basin. For the round-basin fountain base, the central statue stand and statue are installed before placing the access lid over the basin, which allows the installer to stand inside the basin while handling the statue. This is a helpful advantage when installing a heavy statue. Once the statue has been installed, the pump and water hoses are installed, the access lid is placed over the basin, the basin is filled with water, and decorative material is placed over the access lid. For the square-basin fountain base, the pillars, pump, water hoses, central support panel and access lid are typically installed before one or more statues are installed on the access lid. For this alternative, the statues are placed directly on one or more panels of the access lid. Hinged or removably doors in the panels permit maintenance access to the basin, and one or more panels may left without a statue to support so that this panel can be removed without removing any of the statues from the access lid. Pebbles or other ornaments put directly on top of the access lid give the fountain the disappearing water effect.

The particular embodiments of the round-basin and square-basin fountain bases shown in the figures, which are known as Your Ultimate Fountain Base™, have distinctive design advantages. The round-basin fountain base is light weight with the whole unit weighing only 19 pounds for a fountain base with a basin having a diameter of 36 inches and a height of 10 inches, a center statue stand having a diameter of 12 inches and a height of 10 inches, and an access lid having six panels. A hole or routing port through the center of the statue stand allows passage of a water hose from a pump located in the basin to the fountain top. The routing port guides the tubing from fountain top through top of the statue stand for connection to the pump for easy installation of the water supply hose. The central statue stand provides a very sturdy statue that can accommodate a large and heavy statue. The 36-inch round-basin fountain stand manufactured from polypropylene has been tested to support up to 5000 lbs set on top of the statue stand with the stand located within the basin in its intended position.

Also, the removable panels of access lid of the round-basin fountain base makes the installation and maintenance very easy. A typically fountain owner without any training or instruction can readily take any panels of the access lid off the unit to change the pump or perform cleaning of the interior of the basin with ease, without having to remove the statue from the central statue stand. In the old fashion way, the statue atop the fountain, which can weigh several hundred to a couple of thousand pounds, needs to be removed before the base can be cleaned or serviced. Holes in the access lid not only allow water to return to the basin, but can also be used for setting up smaller fountain spitters.

The square-basin fountain base exhibits the same advantages as the round-basin fountain base described above, except that each of four panels forming the access lid are designed to serve as separate statue stands. In addition to being removable, each panel forming the access lid includes a door for accessing the interior of the basin without removing any of the panels of the access lid. The access lid of the square-basin fountain base is supported by a system of pillars and a centrally located support panel underlying the four top panels. A typical square-basin fountain base includes basin that is 44 inches on each side, and each panel of the access lid may be about 20 inches on a side. Of course, the component sizes may be changed to accommodate fountain bases of different sizes.

The fountain base can be manufactured form any suitable material, such polypropylene. However, other material, such as polyethylene, ABS (acrylonitrile butadiene styrene), Nylon or Lexan® may also be suitable. The basin, statue supports (e.g., central statue stand or system of pillars) and the panels forming the access lid may be manufactured through a blow mold or injection mold technique. In particular, the basin may be blow molded and the statue supports may be injection molded. Injection molded polypropylene components are currently believed to have desirable cost, strength and shrinkage characteristics.

Turning now to the figures, in which like numerals refer to like elements throughout the figures, FIG. 1 is a front view of an assembled disappearing water fountain 10 having a stone statue 12 supported by a round-basin fountain base 14. The statue 12 is surrounded by decorative pebbles 16 located on top of the access lid of the fountain base 14 to give the fountain the disappearing water effect. The statue 12 includes an internal water conduit for carrying water from below to the top of the statue, where is can be released to flow downward over the exterior of the statue. The fountain base includes a round basin 20, a central statue stand (not shown in this figure) and a porous access lid (not shown in this figure) supporting the statue 12, which is located in the center of the access lid. FIG. 1 also shows the power cord 22 for connecting the water pump (not shown in this figure) located inside the basin 20 to a conventional household A/C electric power supply. The pump delivers water from the basin 20 through the water conduit through the statue 12 to the top of the statue, where it is released to flow downward over the exterior of the statue, through the decorative pebbles 16 and porous access lid covering the basin, back into the basin where the water is recirculated.

Figure 2:
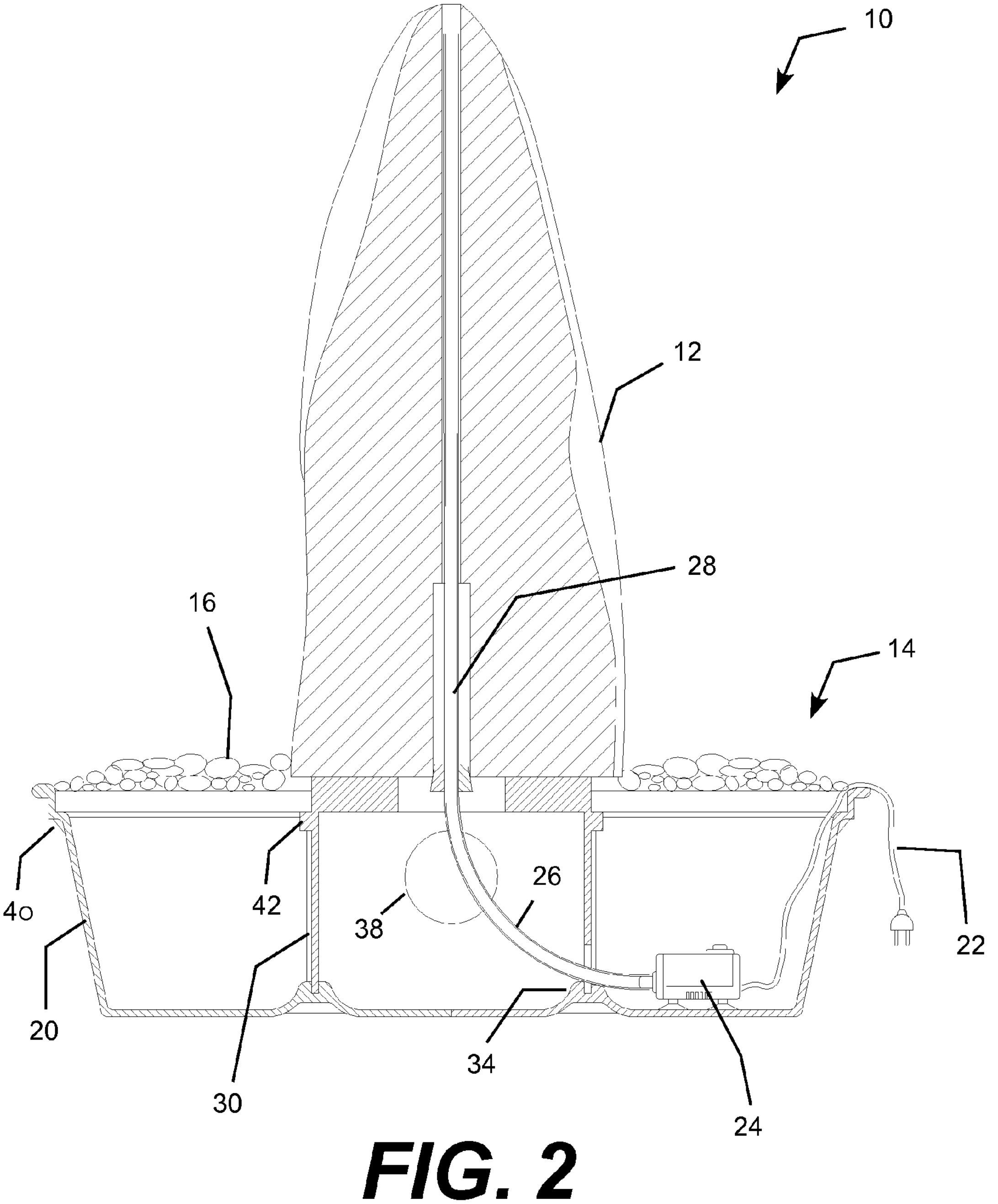
FIG. 2 is a front cross-section view of the disappearing water fountain having the round-basin fountain base.

FIG. 2 is a front cross-section view of the disappearing water fountain 10. FIG. 2 shows the power cord 22, which is connected to a pump 24 located in the interior of the basin 20. The pump delivers water from the interior of the basin through a water supply hose 26 to the conduit 28 through the statue 12. FIG. 2 also shows the central statue stand 30 and the access lid 32 in cross-section. The statue stand 30 is supported in the center of the basin 20 by a socket 34 formed in the bottom of the basin. In this configuration, the pump 24 is located at the bottom of the basin 20 outside the statue stand 30. The water supply hose 26 passes through a routing port 36 formed into the bottom of the statue stand 30 and the socket 34 (also shown in FIGS. 15 and 16). The central statue stand 30 also includes an access hole 38 to help the installer route the water supply hose 26 through the routing port 36 and into connection with the conduit 28 through the statue 12. The panels of the access lid 32 are supported by a first support lip 42 on the basin around the interior perimeter near the top of the basin and a second support lip 42 on the statue stand around the exterior perimeter near the top of the statue stand.

Figure 3:
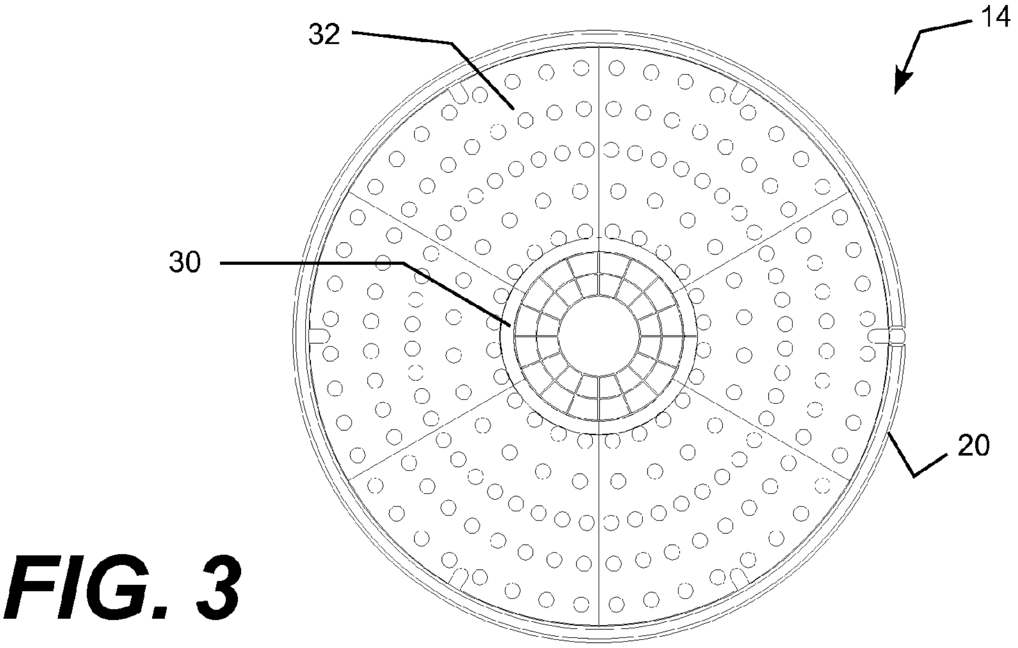
FIG. 3 is a top view of the round-basin fountain base.
Figure 4:
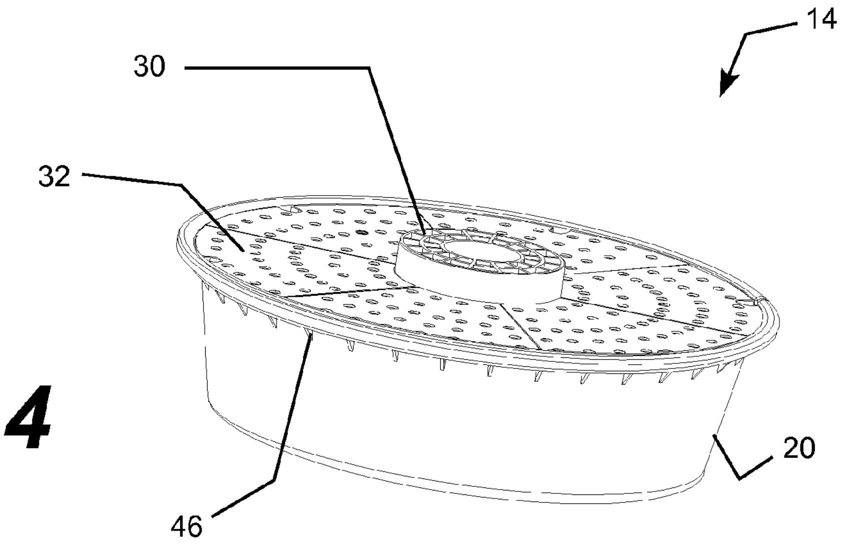
FIG. 4 is a perspective view showing the top side of the round-basin fountain base.

FIG. 3 is a top view and FIG. 4 is a perspective view of the round-basin fountain base 14 showing the access lid 32 and the central statue stand 30. As shown in FIG. 3, the access lid of this particular embodiment includes six panels, which are preferably identical and interchangeable. The top portion of the central statue stand 30 includes waffle structure to add strength and rigidity to the statue stand. As shown in FIG. 4, the basin 20 includes a system of corner braces represented by the enumerated corner brace 46 to add strength and rigidity to the basin.

Figure 5:
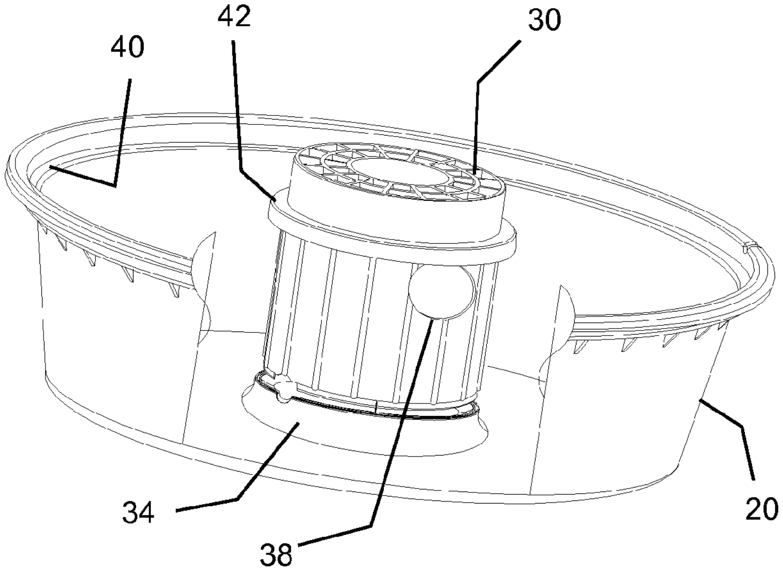
FIG. 5 is a perspective view of the round-basin fountain base with the access lid removed and a cut-away showing the central statue stand.
Figure 6:
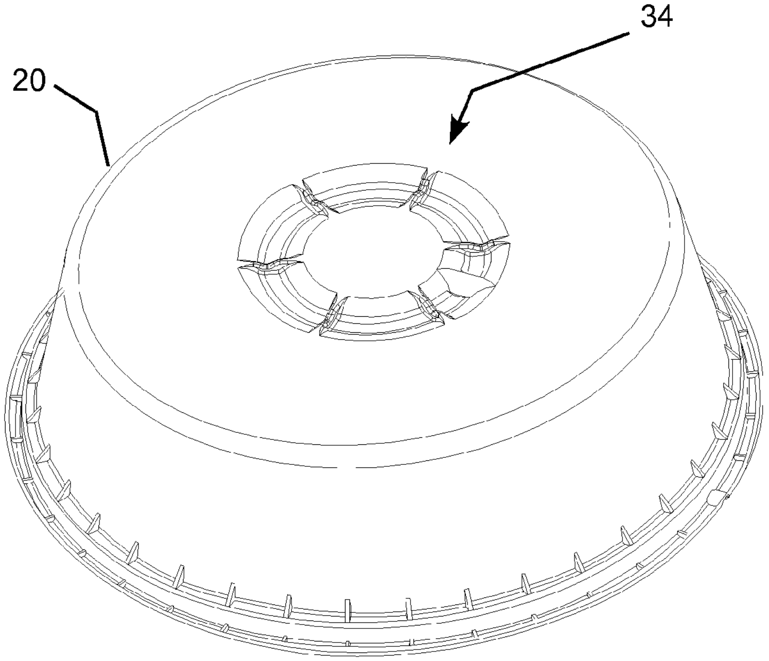
FIG. 6 is a perspective view of the round-basin fountain base showing the bottom side of the basin.

FIG. 5 is a perspective view of the round-basin fountain base with the access lid removed and a cut-away showing the central statue stand 30. This view shows the first support lip 40 around the internal perimeter of the basin 20 and the second support lip 42 around the external perimeter of the central statue stand 30. This view also shows the socket 34 formed into the bottom of the basin 20 for receiving and supporting the central statue stand 30 and the routing port 36 formed into the bottom of the central statue stand and the socket. FIG. 6 is a perspective view of the round-basin basin fountain base showing the bottom side of the basin 20 and the socket 34 formed into the bottom of the basin.

Figure 7:
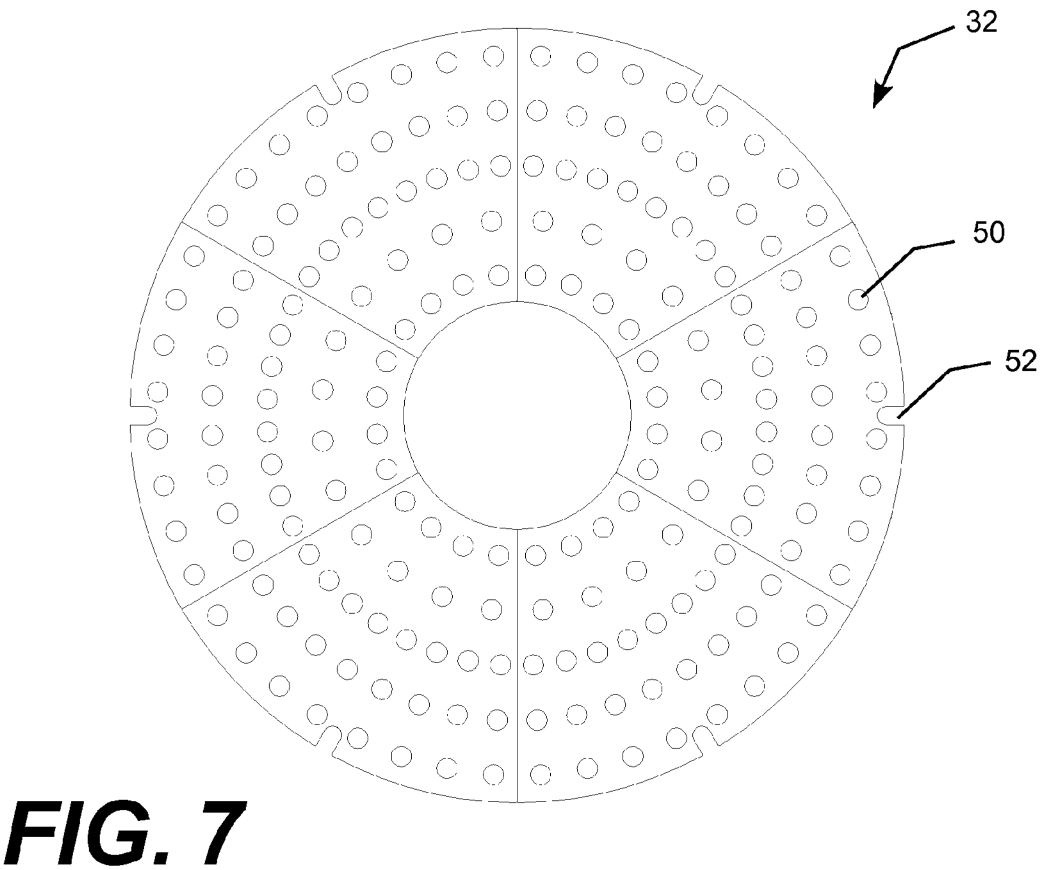
FIG. 7 is a top view of the access lid for the round-basin fountain base.
Figure 8:
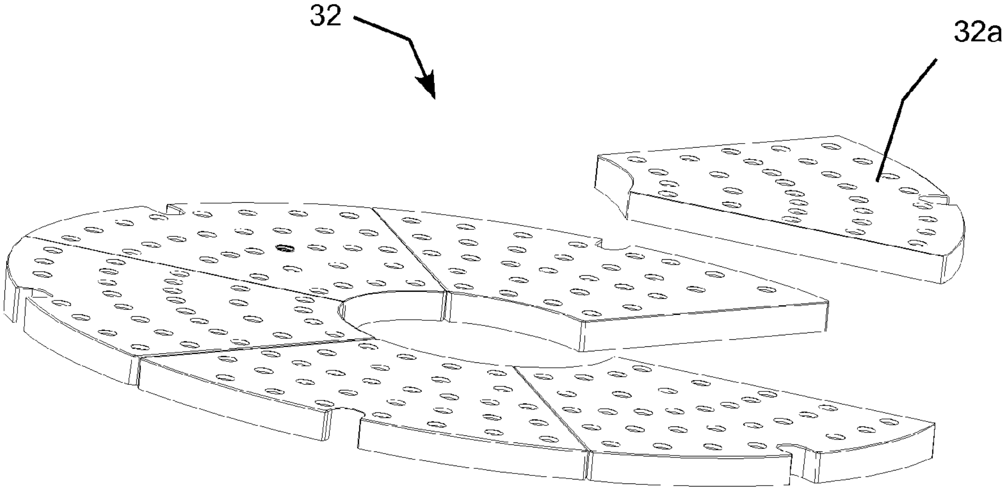
FIG. 8 is a perspective view of the access lid for the round-basin fountain base illustrating removal of a panel of the access lid.
Figure 9:
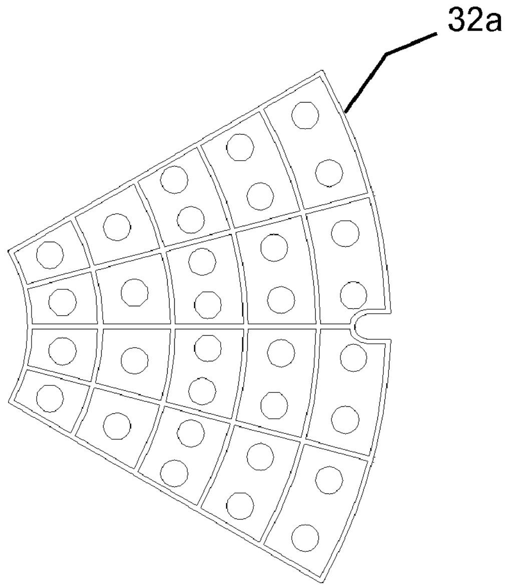
FIG. 9 is a bottom view of an illustrative panel of the access lid of the round-basin fountain base.
Figure 11:
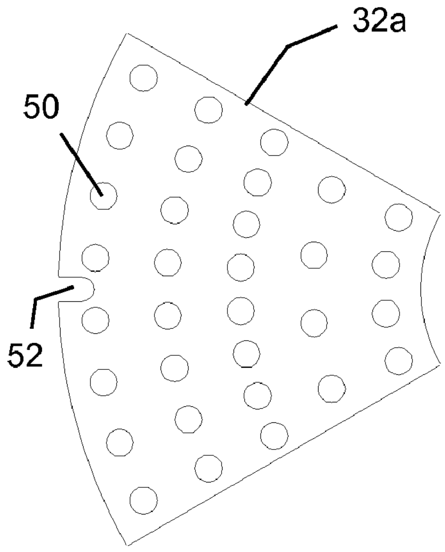
FIG. 11 is a top view of the illustrative panel of the access lid of the round-basin fountain base.
Figure 10:
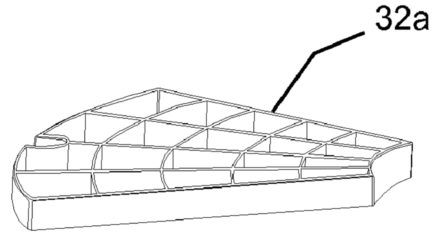
FIG. 10 is a perspective view showing the bottom side of the illustrative panel of the access lid of the round-basin fountain base.
Figure 12:
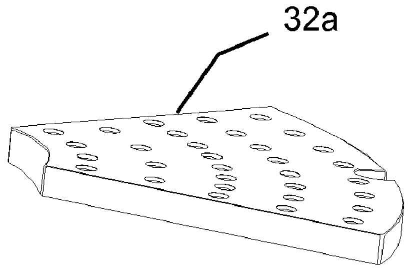
FIG. 12 is a perspective view showing the top side of the illustrative panel of the access lid of the round-basin fountain base.

FIG. 7 is a top view and FIG. 8 is a perspective view of the access lid 32 illustrating removal of an illustrative panel 32*a* of the access lid. FIG. 9 is a bottom view of the illustrative panel and FIG. 10 is a perspective view showing the bottom side of the illustrative panel of the access lid. Similarly, FIG. 11 is a top view of the illustrative panel and FIG. 12 is a perspective view showing the top side of the illustrative panel of the access lid. As shown in FIG. 7, the access lid includes a system of holes represented by the enumerated hole 50 to allow water to pass through the lid. Each panel also includes a finger-pull slot represented by the enumerated finger-pull slot 52 to assist an person in removing the panel from the basin. Referring to FIG. 10, each panel also includes a waffle structure 54 to add strength and rigidity to the panel.

Figure 13:
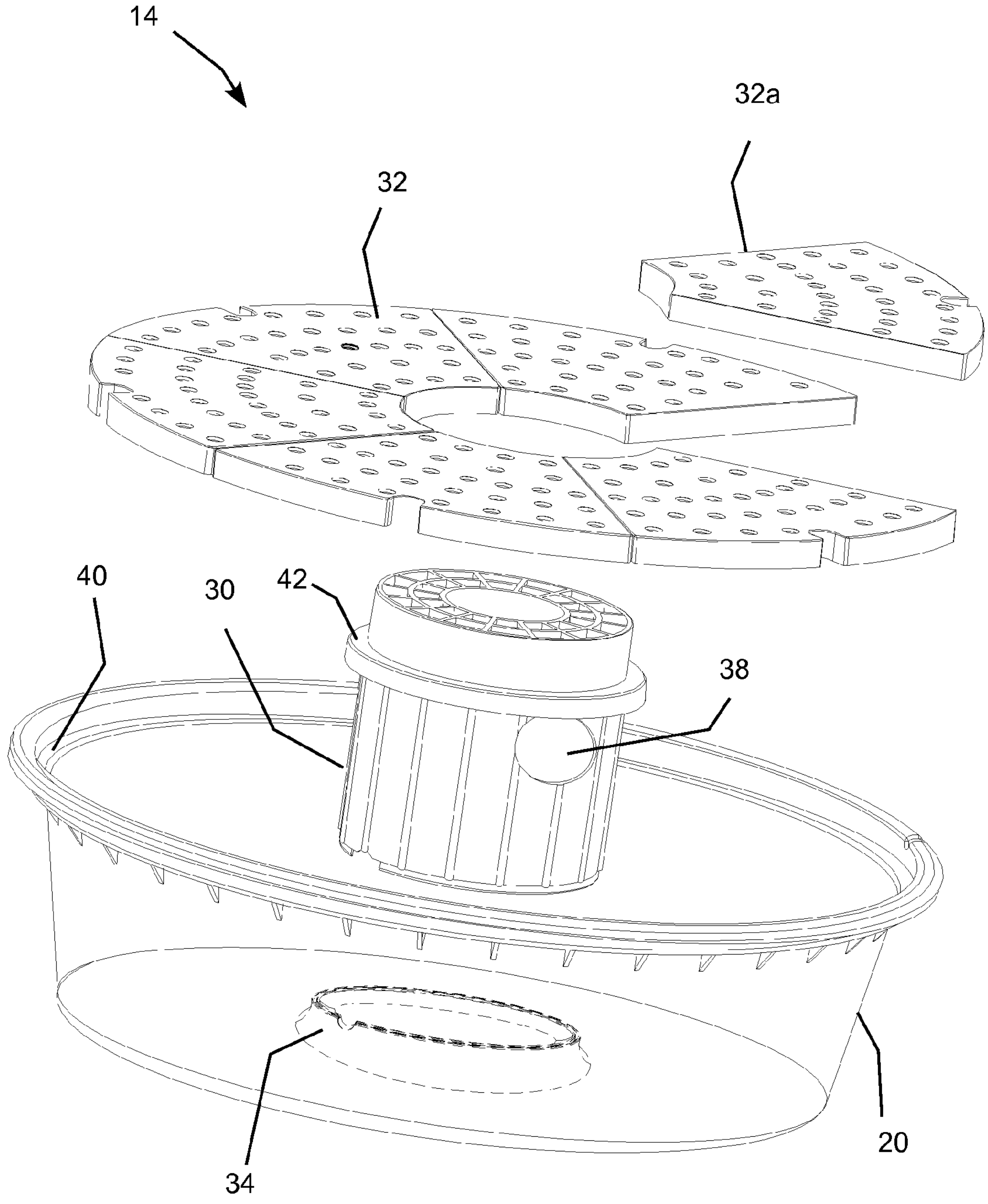
FIG. 13 is an exploded view of the round-basin fountain base.
Figure 14:
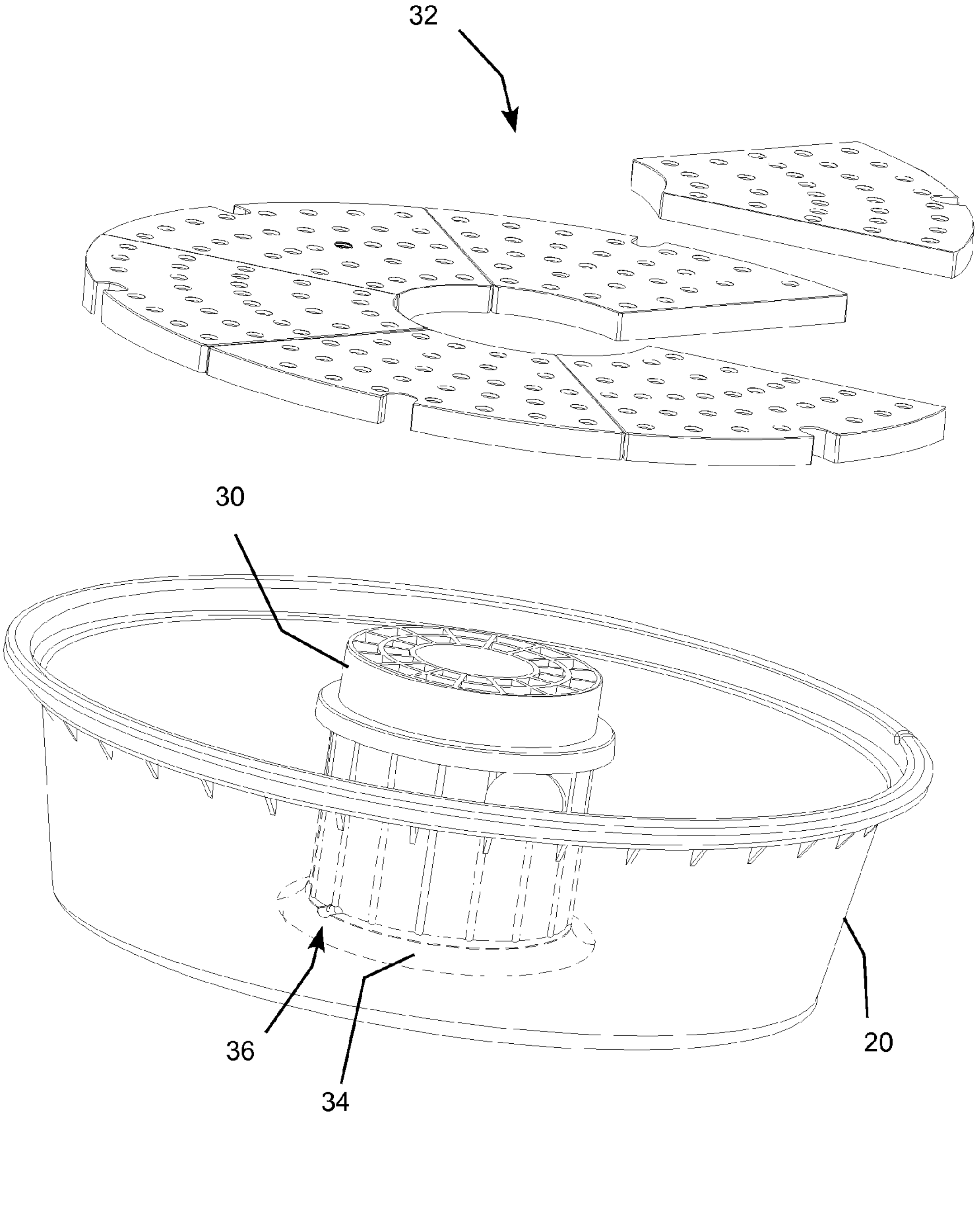
FIG. 14 is an exploded view of the round-basin fountain base illustrating installation of the central statue stand in the basin.
Figure 15:
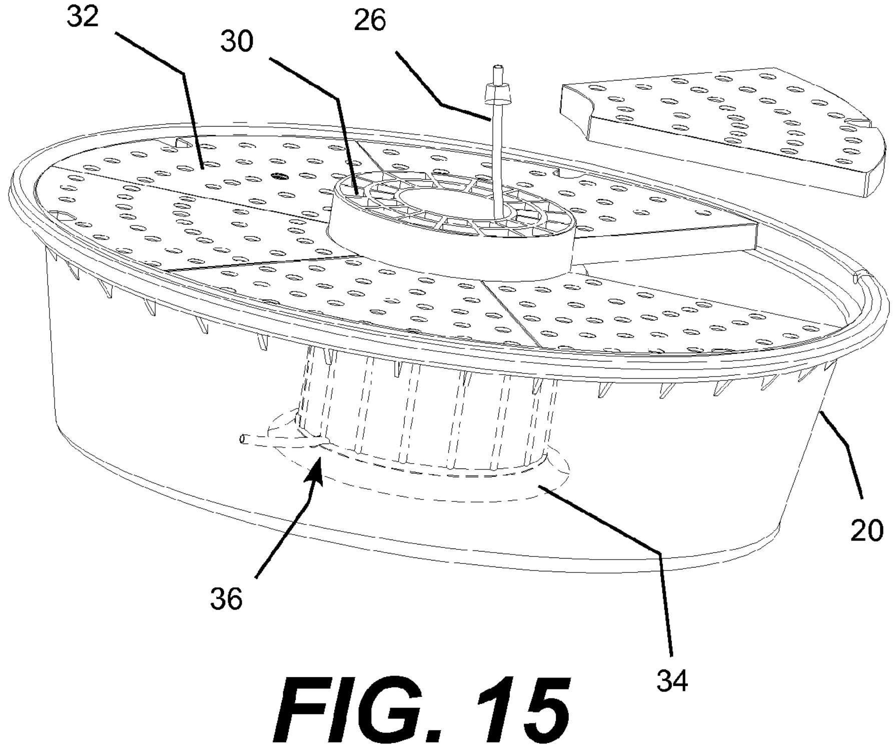
FIG. 15 is an exploded view of the round-basin fountain base illustrating the routing of the water supply hose through the central statue stand.
Figure 16:
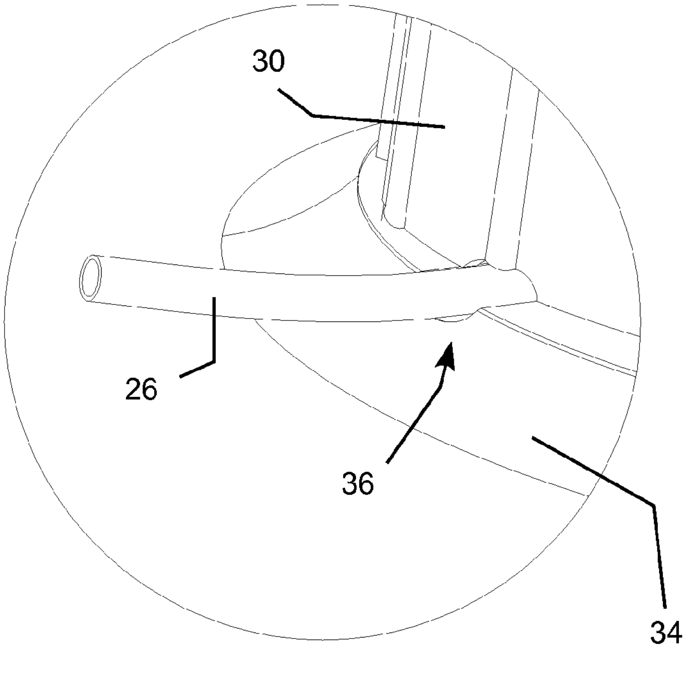
FIG. 16 is a detail view of the routing of the water hose through a routing port between the central statue stand and the basin of the round-basin fountain base.

FIGS. 13-16 illustrate assembly of the fountain base 14. FIG. 13 is an exploded view of the round-basin fountain base 14 showing the basin 20, the central statue stand 30 and the access lid 32. This view also shows the socket 34 formed into the bottom of the basin and the access hole 38 in the central statue stand. The first and second support lips 40, 42 are also well shown in this view. To assemble the fountain base 14, the central statue stand 30 is placed into the socket 34 as shown in FIG. 14. The water supply tube 26 is then routed through the port 36 and out the top of the central statue stand, as shown in FIG. 15. The central statue stand 30 has a portion extending above the access lid 32, which allows the statue to sit directly on the statue stand supported above the access lid. This makes it possible to remove the panels of the access lid 32 without removing the statue from the statue stand 30. FIG. 16 shows a detail view of the water supply tube 26 passing through the routing port 36. From this point, the pump 24 and conduit 28 through the statue are each connected to their respective ends of the water supply tube 26, and the fountain is ready for operation. The access lid 32 is then placed over the basin and decorative pebbles or another cover material may also be added on top of the access lid, if desired, as shown in FIG. 1.

Figure 17:
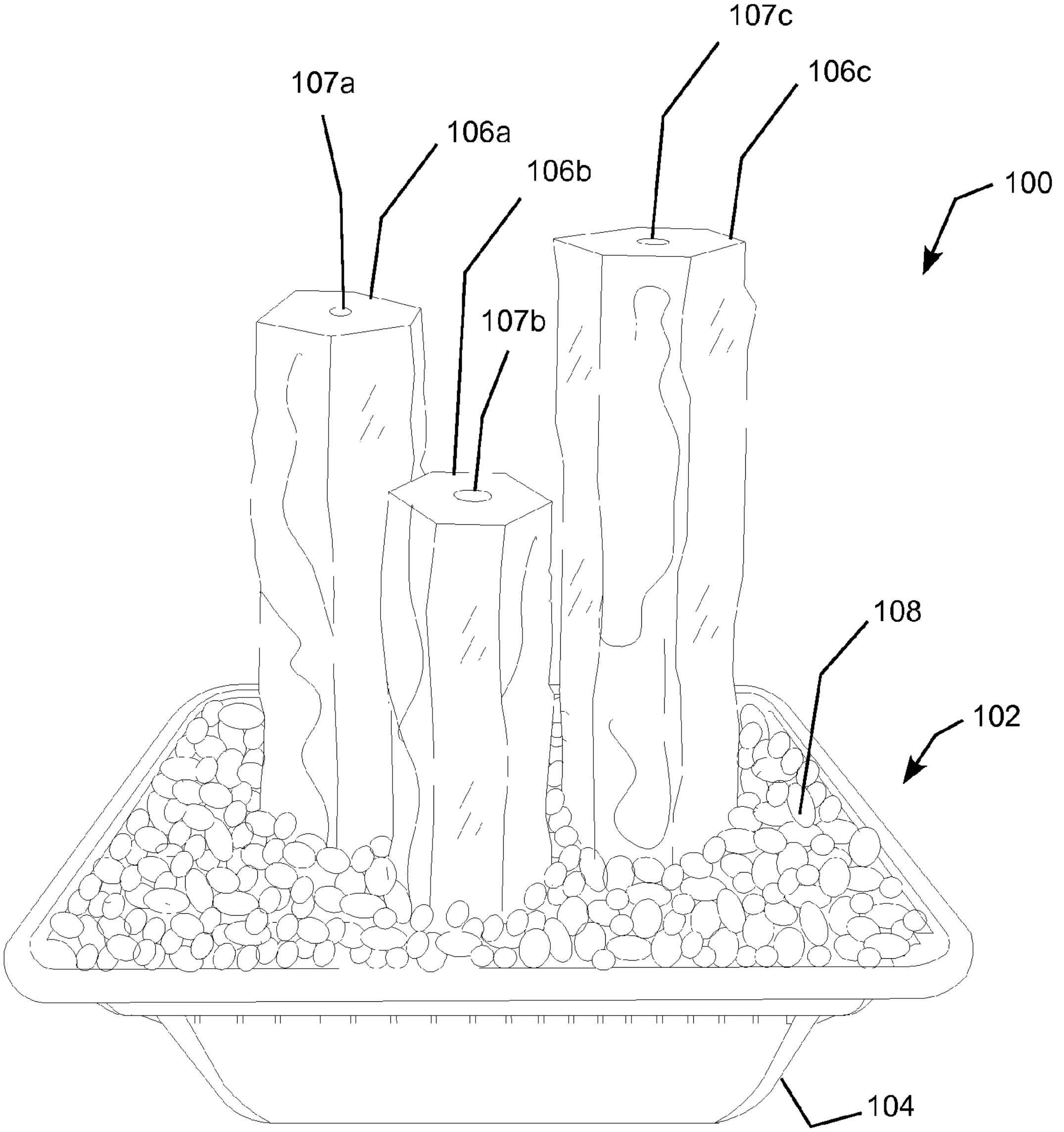
FIG. 17 is a perspective view of an assembled disappearing water fountain having a square-basin fountain base including a square basin and an access lid supporting three statues.
Figure 18:
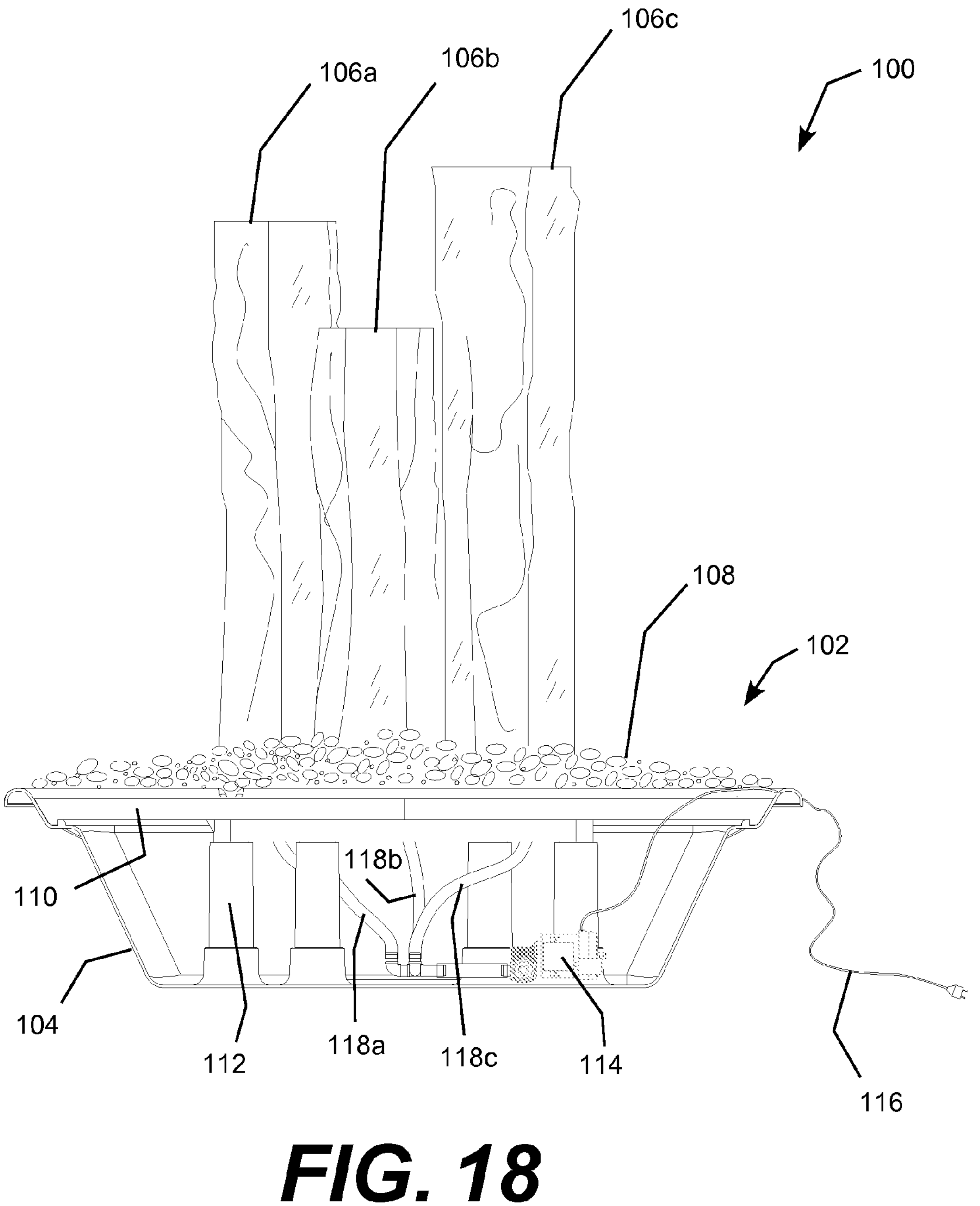
FIG. 18 is a front cross-section view of the disappearing water fountain having the square-basin fountain base.

FIG. 17 is a perspective view of an assembled disappearing water fountain 100 including a square-basin fountain base 102. This fountain base includes a square basin 104 supporting three statues 106*a-c* that each include an internal water conduit 107*a-c,* respectively. The access lid of the fountain base 102 is covered with decorative pebbles 108 and operates as a disappearing water fountain, as described previously. FIG. 18 is a front cross-section view of the disappearing water fountain 100 showing the internal components, including an access lid 110 supported by a system of pillars represented by the enumerated pillar 112. The fountain base 102 also includes a pump 114 and associated power cord 116 for delivering water from the interior of the basin through the water hoses 118*a-c* to the internal water conduits 107*a-c,* respectively. The square-basin fountain base 102 operates in similar fashion to the round-basin fountain base 10 described with reference to FIGS. 1-16, except that the access lid 110 of the square-basin fountain base has a number of knock-out plugs that allow multiple statues to be placed at various locations on the lid, as represented by the three statues 106*a-c* shown in FIGS. 17-18.

Figure 19:
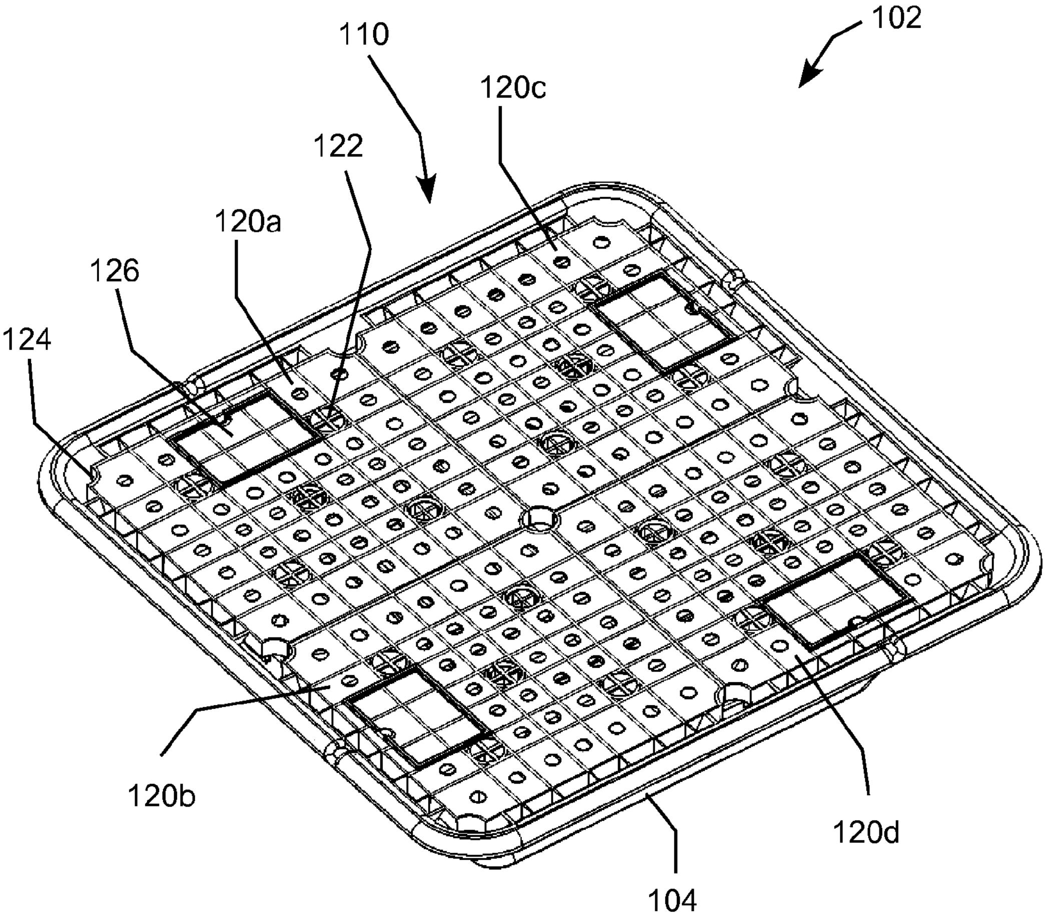
FIG. 19 is a perspective view of the assembled square-basin fountain base.
Figure 22:
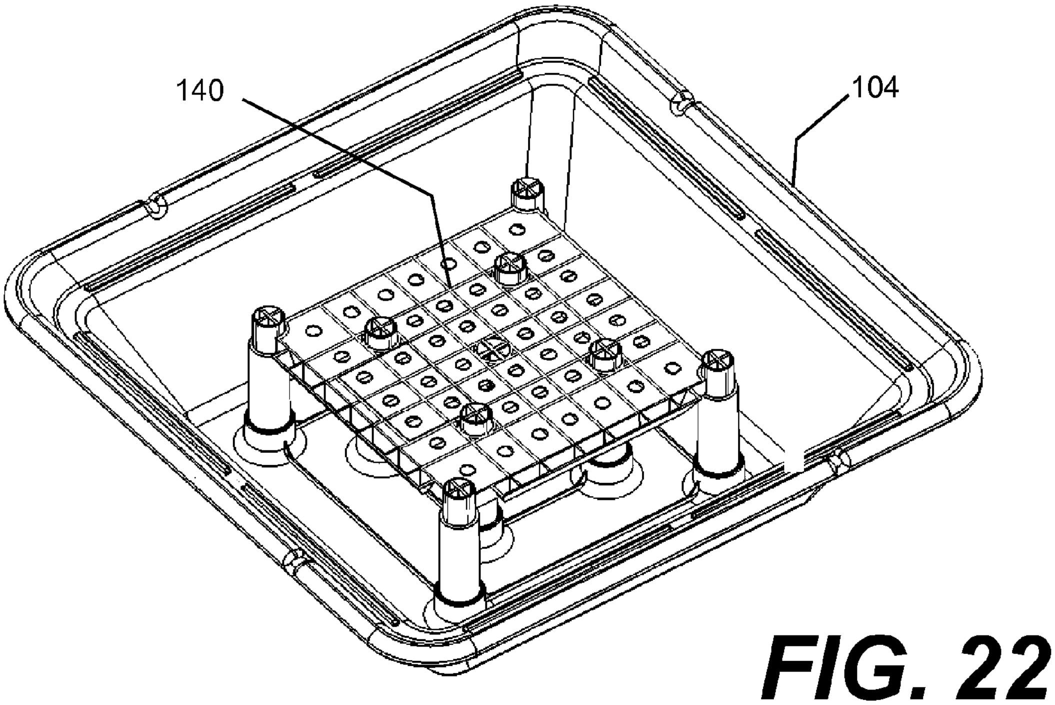
FIG. 22 is a perspective view showing the basin of the square-basin fountain base with a central support panel installed on the support pillars.

FIG. 19 is a perspective view of the assembled square-basin fountain base 102 showing the basin 104 covered by the access lid 110, which is comprised of four similar access panels 120*a-c*. Referring to access panel 120*a* as a representative panel, the panel includes five knock-out plugs represented by the enumerated knock-out plug 122. The access panel also includes inset rounded corners represented by the enumerated inset rounded corner 124 that allows the panel to receive a pillar, as shown in FIG. 22. The access panel further includes a door 126 that can be hinged opened or removed to permit maintenance access to the interior of the basin 104 without removing the panel.

Figure 20:
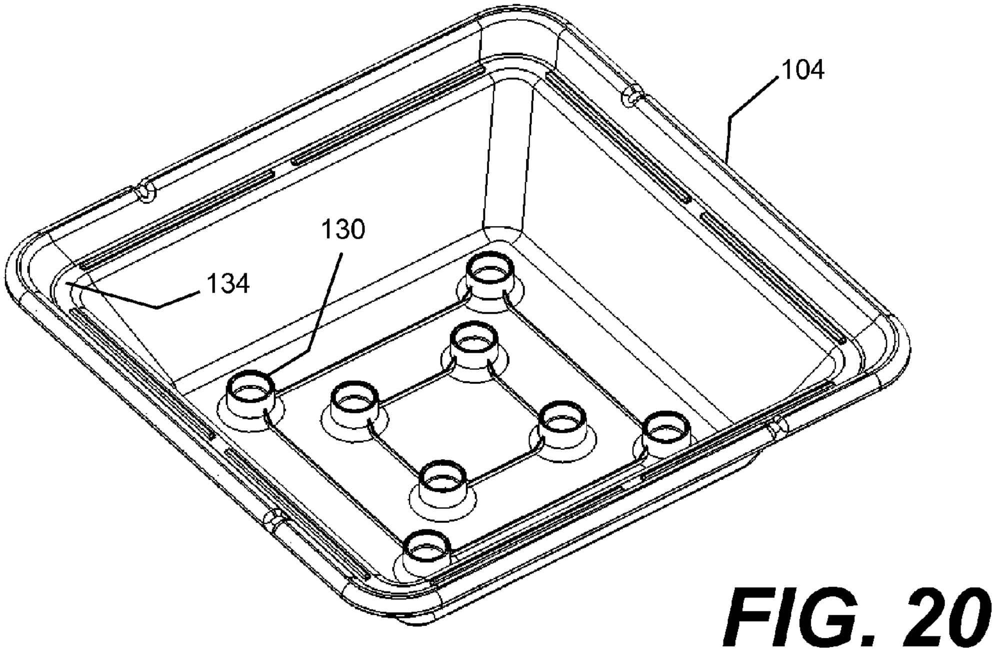
FIG. 20 is a perspective view showing the interior of the basin of the square-basin fountain base.
Figure 21:
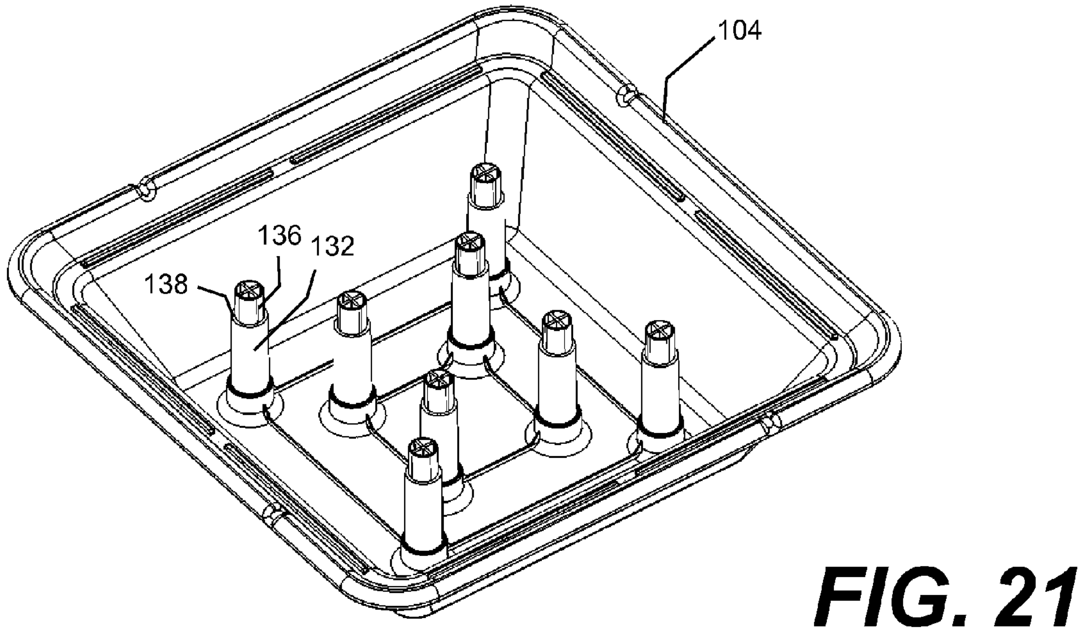
FIG. 21 is a perspective view showing the interior of the basin of the square-basin fountain base with support pillars installed.

FIG. 20 is a perspective view showing the interior of the basin 104 without the support pillars installed, and FIG. 21 is a similar view showing the basin with pillars installed. The basin 104 includes a system of sockets represented by the enumerated socket 130 formed into the bottom of the basin. As shown in FIG. 21, each socket is configured to receive and support an associated pillar represented by the enumerated pillar 132. The basin 104 also includes a support lip 134 around the inner perimeter near the top of the basin. The access lid 110 is supported by the support lip 134 and the pillars. This particular embodiment includes eight pillars arranged at the corners of concentric squares. Each pillar includes a cuff forming a support lip, as represented by the enumerated cuff 136 and support lip 138. The cuff 136 of each pillar is sized to fit within a knock-out hole through the panel opened by removing the knock-out plug 122, which allows the panel to be received over the cuff 136 and supported by the support lip 138 of the pillar. The inset rounded corner 124 of the panel is also sized to receive the cuff 136 of the pillar and be supported by the associated support lip 138.

Figure 23:
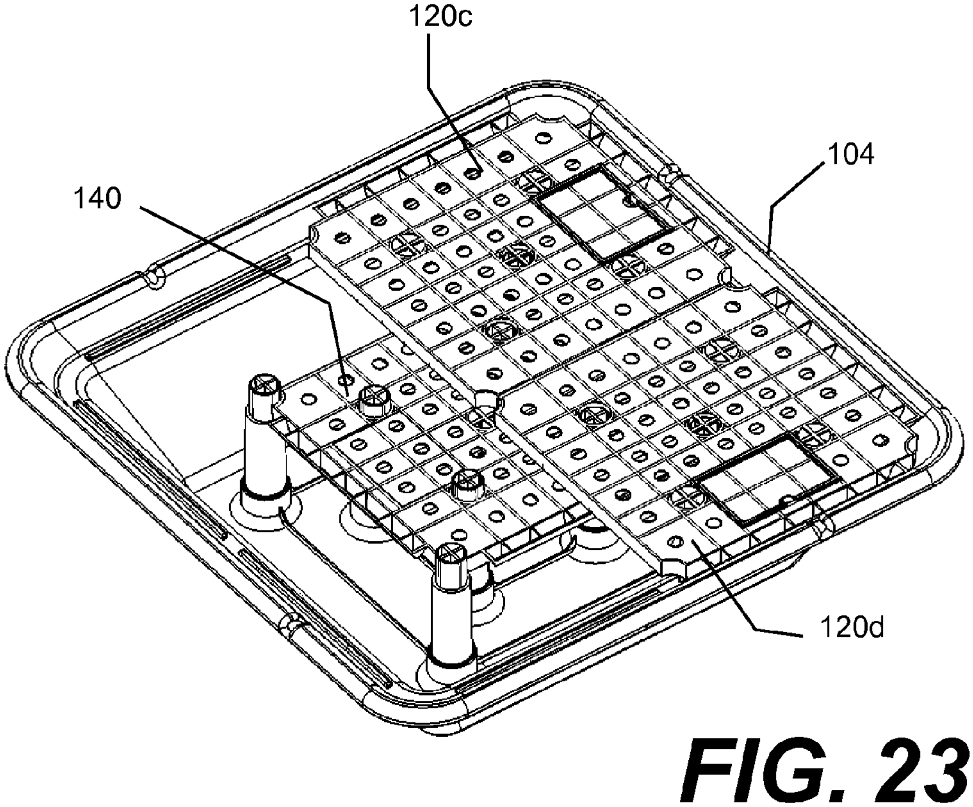
FIG. 23 is a perspective view showing the basin of the square-basin fountain base with two panels of the access lid installed over the central underlying panel.

FIG. 22 shows the basin 104 with a central support panel 140 installed on the system of pillars. The central support panel 140 is installed by knocking out four of the knock-out plugs (represented by the knock-out plug 122 enumerated in FIG. 19). The central support panel 140 is then placed over the system of pillars with the cuffs of four pillars received through knock-out holes and the cuffs of four additional pillars received by the inset rounded corners of the panel. This provides support from eight pillars for the central support panel 140. In addition, the cuff of each pillar is slightly longer than the thickness of the access panel, which allows a portion of the cuff of each pillar to extend above the central support panel when the panel is supported by the pillars, as shown FIG. 22. As shown in FIG. 23, this allows the panels of the access lid to be received on the cuffs of the same pillars, where they are supported by the central support panel 140 and the support lip 134 around the inner perimeter of the basin 104. Each panel of the access lid receives two pillars through holes opened by removing knock-out plugs, which leaves the other knock-out holes available to receive water hoses for statues. The center knock-out plug of the central support panel 140 can also be removed to provide a routing port for a water hose. At the center location, the inset rounded corners of the panels of the access lid 110 also form a routing port for a water hose at the center of the access lid.

Figure 24:
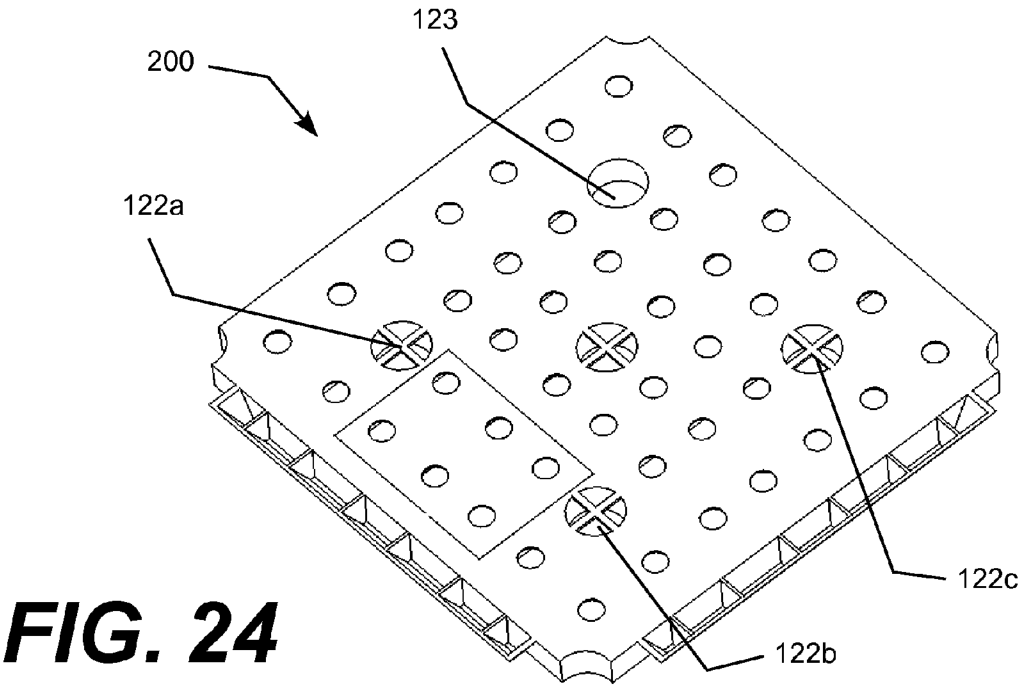
FIG. 24 is a perspective view showing the top side of an illustrative panel of the access lid of the square-basin fountain base.
Figure 25:
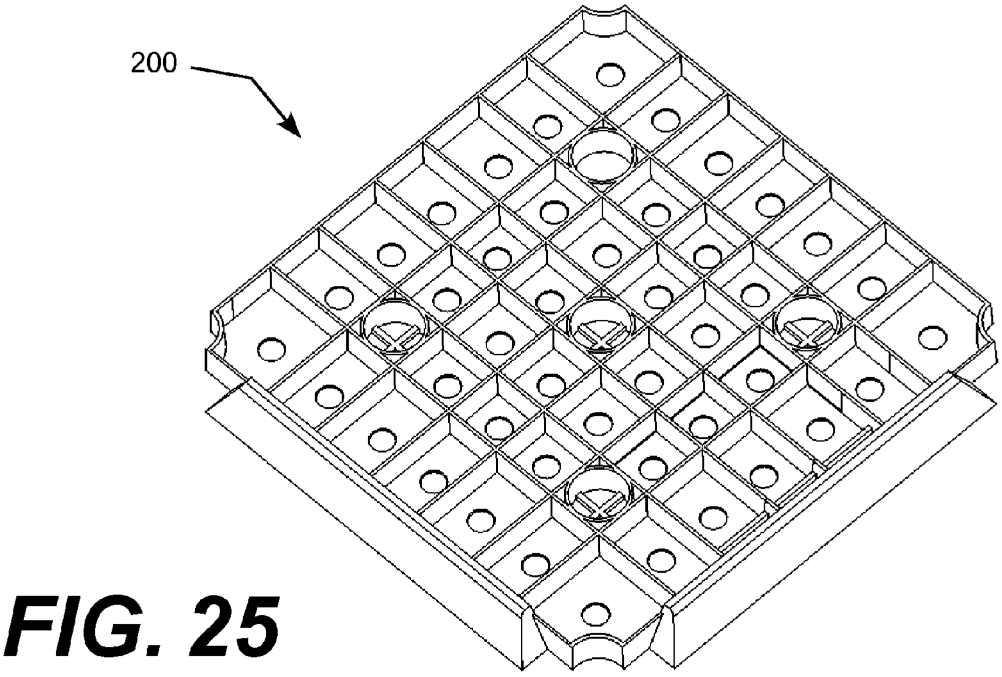
FIG. 25 is a perspective view showing the bottom side of the illustrative panel of the access lid of the square-basin fountain base.

FIG. 24 is a perspective view showing the top side of a representative panel 200 of the access lid 110 of the square-basin fountain base 102, which can also be used as the central support panel 140. FIG. 25 is a perspective view showing the bottom side of the panel 200, which shows that the panel has a waffle structure to add strength and rigidity to the panel. This particular panel 200 includes five knock-out plugs. Four of the knock-out plugs 122*a-d* are shown in the panel with one of the plugs removed to reveal the knock-out hole 123. FIG. 24 also shows the door 126, which can be hinged or removable. As shown in FIG. 25, the knock-out plugs 122*a-d* are not as deep as the panel, which allows a panel of the access lid 110 to fit onto the cuff of a pillar on top of the central support panel 140 without removing the knock-out plug from the access lid panel. This brings a portion of the cuff into but not all the way through the knock-out hole in the access lid panel.

In view of the foregoing, it will be appreciated that present invention provides an improved fountain base for a disappearing water fountain that supports a statue on top of an access lid that permits maintenance access to the interior of the basin without removing the statue from the fountain base.

The invention claims is:

1. A fountain base for supporting a statue on top of a disappearing water fountain, comprising:

a basin sized and configured to be handled by hand as an integral unit;

an access lid comprising multiple independently removable panels configured to be supported at or near a top side of the basin;

a statue stand located within the basin comprising a first surface to support a heavy statue weighing at least several hundred pounds independent of the presence of the removable panels in the basin and a second surface to support the access lid;

wherein the access lid permits maintenance access to the interior of the basin without having to remove the statue from the statue stand;

wherein each independently removable panel of the access lid is supported along a first side by the basin and along a second side by the second surface of the statute stand; and wherein the independently removable panels of the access lid are configured for removal from the basin while the statute stand remains located within the basin with the statue supported by the statue stand.

2. The fountain base of claim 1, further comprising a pump located within the basin for delivering water from the basin through a conduit to an upper portion of the statue where the water is released to flow downward over an exterior surface of the fountain, through the access lid, and back into the basin.

3. The fountain base of claim 2, wherein each independently removable panel has a plurality of holes for allowing water to pass through the panel.

4. The fountain base of claim 1, wherein:

the statue stand supports the statue above the panels of the access lid to facilitate removal of the panels from the basin without removal of the statue stand from the basin, and without removal of the statue from the statue stand.

5. The fountain base of claim 1, wherein the access lid is configured to be supported by a first support lip around an internal perimeter of the basin and a second support lip around an external perimeter of the statue stand defining the second surface of the statue support.

6. The fountain base of claim 1, wherein the basin comprises a socket formed into a bottom side of the basin for receiving and supporting the statue stand.

7. The fountain base of claim 6, wherein the socket is centrally located in the bottom side of the basin.

* * * * *